United States Patent [19]
Umegaki

[11] Patent Number: 5,283,576
[45] Date of Patent: Feb. 1, 1994

[54] DISPARITY DETECTION CIRCUIT FOR A 2-BIT TO 4-BIT CODED SIGNAL DECODER

[75] Inventor: Takashi Umegaki, Osaka, Japan

[73] Assignee: Fujitsu Limited, Kanagawa, Japan

[21] Appl. No.: 876,570

[22] Filed: Apr. 30, 1992

[30] Foreign Application Priority Data

May 20, 1991 [JP] Japan .................. 3-114780

[51] Int. Cl.$^5$ .............................................. H03M 7/00
[52] U.S. Cl. ................................. 341/58; 371/57.1; 375/19; 364/715.09
[58] Field of Search ............... 341/58, 59, 63, 106; 364/715.09, 715.10, 715.11; 371/57.1, 57.2; 375/19

[56] References Cited

U.S. PATENT DOCUMENTS

| | | | |
|---|---|---|---|
| 4,499,454 | 2/1985 | Shimada | 341/58 |
| 4,617,552 | 10/1986 | Kojima et al. | 341/58 |
| 5,016,258 | 5/1991 | Tanaka et al. | 341/58 X |

FOREIGN PATENT DOCUMENTS

0352970 1/1990 European Pat. Off.
2016247 9/1979 United Kingdom.

OTHER PUBLICATIONS

Telecommunications and Radio Engineering, vol. 40/41, Aug. 1986, No. 8 Washington US pp. 19–24.
D. G. Tunev 'A Multilevel Code for Digital Transmission Systems'; p. 19, line 1–line 16; p. 21, line 4–p. 23, line 6.

Primary Examiner—Howard L. Williams
Attorney, Agent, or Firm—Armstrong, Westerman, Hattori, McLeland & Naughton

[57] ABSTRACT

A disparity detection circuit used in a signal decoder which decodes a 4-bit signal into an original 2-bit main signal and 1-bit service signal, from which the 4-bit signal is coded according to a coding rule which stipulates that an original 2-bit main signal and 1-bit service signal should be coded into a 4-bit signal with 1 additional bit added and with pre-determined disparity carrying, determines whether the 4-bit signal conforms to the coding rule and detects the disparity of the 4-bit signal which is determined as conforming to the coding rule.

5 Claims, 8 Drawing Sheets

| ORIGINAL SIGNAL | | 4B SIGNAL | |
|---|---|---|---|
| MAIN SIGNAL | SERVICE CHANNEL | LAST-OCCURED DISPARITY EXCEPT 0 | |
| | | +2 | -2 |
| 0 0 0 0<br>0 0 0 1<br>0 0 1 0 | 1<br>0<br>0 | x x x x<br>(DISPARITY 0) | x x x 1 |
| 0 1 0 0<br>1 0 0 0<br>1 1 0 0 | 1<br>1<br>0 | x x x 0<br>(DISPARITY 0) | |
| 0 0 1 1<br>0 1 0 1 | 0<br>1 | 1101 (DISPARITY +2)<br>1110 | 0001 (DISPARITY −2)<br>0010 |

XXX - ORIGINAL SIGNAL

FIG.1

| 4B SIGNAL | | | | STATUS IN | 2B SIGNAL | | | STATUS OUT |
|---|---|---|---|---|---|---|---|---|
| A1 | A2 | A3 | A4 | | B1 | B2 | S3 | |
| DISPARITY 0 | | | | 0 | ORIGINAL SIGNAL | | | 0 |
| | | | | 1 | | | | 1 |
| DISPARITY +2 | | | | 0 | A1 | A2 | A3 | 1 |
| | | | | 1 | A1 | A2 | A3 | 1 |
| DISPARITY −2 | | | | 0 | ORIGINAL SIGNAL | | | 0 |
| | | | | 1 | | | | 0 |
| DISPARITY +2 | | | | 0 | A1 | A2 | A3 | 0 |
| | | | | 1 | A1 | A2 | A3 | 1 |
| DISPARITY −2 | | | | 0 | A1 | A2 | A3 | 0 |
| | | | | 1 | A1 | A2 | A3 | 1 |
| 0 | 0 | 0 | 0 | x | | | | |
| 1 | 1 | 1 | 1 | x | | | | |

DEFINED / UNDEFINED

FIG. 2

| 4B SIGNAL | DISPARITY |
|---|---|
| 0000 | -4 |
| 0001<br>0010<br>0100<br>1000 | -2 |
| 0011<br>0101<br>1001<br>0110<br>1010<br>1100 | 0 |
| 0111<br>1011<br>1101<br>1110 | +2 |
| 1111 | +4 |

FIG.3

| SIGNAL | | DISPARITY DISCRIMINATED | |
|---|---|---|---|
| S1 | S2 | | |
| 0 | 0 | -2, +2 | DEFINED |
| 0 | 1 | 0 | |
| 1 | 0 | | |
| 1 | 1 | -4<br>+4<br>-2<br>+2 | UNDEFINED |

DISPARITY DETECTION CIRCUIT FOR A 2-BIT TO 4-BIT CODED SIGNAL DECODER

BACKGROUND OF THE INVENTION

1. Field of the Invention

The present invention relates to a disparity detection circuit used for a 2-bit to 4-bit coded signal decoder (hereinafter simply called decoder).

In digital signal transmission, a self-timing method is usually used, in which a signal receiver extracts a timing signal from a signal transmitted serially and establishes synchronization with the signal based upon the timing signal. In the self-timing method, however, if a streak of logical-0 bits occurs in a data bit string to be transmitted, without including a logical-1 bit, for example, it is difficult for the receiver to discriminate a timing signal. In order to prevent such inconvenience, a 2-bit to 4-bit (hereinafter called 2B4B) coding rule is widely used in optical terminal repeater equipment or intermediate repeater equipment.

A 2B4B-coded signal decoder decodes a 2B4B-coded signal into an original signal by using a disparity detection circuit which detects disparity of the 2B4B-coded signal.

In order to reduce the cost and, therefore, the amount of circuitry of a 2B4B-coded signal decoder, it is an absolute necessity to reduce the amount of circuitry constituting each functional unit of the signal decoder, including a disparity detection circuit.

Therefore, a disparity detection circuit made of as small amount of circuitry as possible, is in great demand.

2. Description of the Related Art

The 2B4B coding rule is a rule for coding a 2-bit main signal and a 1-bit service signal into a 4-bit signal (hereinafter called 4B signal) according to a 2B4B coding rule (see FIG. 1), with an additional bit added. The main signal consists of 2 bits from a data bit string to be transmitted. The service signal, as the alias service channel denotes, is independent of the main signal and carries additional information, e.g., a particular bit-pattern indicating the heading of a data frame and communication control information to be interchanged between intermediate repeater equipment, for example. FIG. 1 is a coding table illustrating an example of a 2B4B coding rule. Decoding a 2B4B-coded signal (i.e., 4B signal) is performed in such a way that disparity of a 4B signal received is first detected and, based on the disparity, the 4B signal is converted into the original signal (i.e., 2-bit main signal and 1-bit service signal) according to a decoding table in FIG. 2. FIG. 2 is a decoding table illustrating an example of decoding a 4B signal.

Disparity shown in FIGS. 1 and 2 is a value obtained by subtracting the number of logical-0 bits from that of logical-1 bits in the 4B signal received, whose 16 bit-patterns and the corresponding disparity are shown in FIG. 3. FIG. 3 is a table illustrating the disparity for 4B signals. Disparity is any of values "0", "+2", "−2", "+4" and "−4". For example, when 4B signal is "0000", in which the number of logical-1 bits is zero and that of logical-0 bits is 4, the disparity of "0000" is "−4". In the same way, the disparity of "0011", in which the number of logical-1 bits is 2 and that of logical-0 bits is 2, is "0".

An additional bit is added to an original signal (2-bit main signal from data to be transmitted plus 1-bit service signal), and the four bits are coded into a 4B signal according to the FIG. 1-coding table.

When an original signal is any of "001", "010" and "100", an additional logical-1 bit is added after the 3 original signal bits to form a 4B signal, in which the disparity results in "0". When an original signal is any of "011", "101" and "110", a logical-0 bit is added after the 3 original signal bits, in which the disparity results in "0". When an original signal is "000" and the last-occurred disparity except "0" is "+2" or "−2", the 4B signal is "1101" or "0001", respectively. When an original signal is "111" and the last-occurred disparity except "0" is "+2" or "−2", the 4B signal is "1110" or "0010", respectively. 4B signals other than those defined in the FIG. 1-coding table are erroneous since the number of combinations of 3 original signal bits are only 8 as described above. For example, 4B signal "0000" is an error.

In the decoding table shown in FIG. 2, a 4B signal (A1, A2, A3, A4) represents 4 bits into which an original signal is coded at a sending end and received at a receiving end, and a 2B signal (B1, B2, B3) represents 3 bits into which the 4B signal received is to be decoded at the receiving end.

When a 4B signal is a code whose disparity is defined in the FIG. 1-coding table (hereinafter simply called defined) with disparity "0" and the last-occurred status (hereinafter called status-in) is logical 0, the 2B signal is the first 3 bits (excluding the additional bit) from which the 4B signal is coded, at a sending end, according to the FIG. 1-coding table. That is, the 2B signal is the original signal. Then, a current status (hereinafter called status-out) is set to logical 0.

When a 4B signal is defined with disparity "0" and the status-in is logical 1, the 2B signal is the first 3 bits (i.e., the original signal) from which the 4B signal is coded according to the FIG. 1-coding table. The status-out is set to logical 1.

For a defined 4B signal with disparity "+2" and the status-in being logical 0, the 2B signal is the first 3 bits (i.e., the original signal) from which the 4B signal is coded according to the FIG. 1-coding table. The status-out is set to logical 1.

For a defined 4B signal with disparity "+2" and the status-in being logical 1, the 2B signal is A1, A2 and A3 as received. The status-out is set to logical 1.

For a defined 4B signal with disparity "−2" and the status-in being logical 1, the 2B signal is the first 3 bits (i.e., the original signal) from which the 4B signal is coded according to the FIG. 1-coding table. The status-out is set to logical 0.

2B signals and their status-out signals of other 4B signals are as shown in the FIG. 2-decoding table.

Thus, a 4B signal received can be decoded into a corresponding 2B signal by detecting disparity of the 4B signal and, based on the disparity detected, status-in and status-out, by selecting either the first 3 bits (i.e., original signal) from which a 4B signal is coded according to the FIG. 1-coding table or the first 3 bits A1, A2 and A3 as received.

FIG. 4 is a block diagram illustrating a decoder circuit of related art, which decodes a 2B4B-coded signal (i.e., 4B signal) into a 2B signal.

A 4B signal received is supplied to a selector 6a, 2B4B-coded signal decoding circuit (hereinafter called 4B2B decoder) 1a, disparity detector 2a and disparity detector 3a. The 4B2B decoder 1a decodes the 4B signal into an original signal (2-bit main signal and 1-bit service signal) from which the 4B signal is coded according to the FIG. 1-coding table. The disparity detector 2a detects the disparity (−4, +4, −2, +2) of the 4B codes undefined in the FIG. 1-coding table. The disparity detector 3a detects the disparity (0, −2, +2) of the defined 4B signals.

A disparity generator 7a, based on a later-explained status-in signal and the disparity detected by the disparity detectors 2a and 3a, generates a status-out signal (logical 0 or 1) according to the FIG. 2-decoding table. A status holder 4a, which is made of a flip-flop, inputs and holds the status-out signal from the disparity generator 7a.

A selection controller 5a, based on the disparity detected, status-in and status-out and according to the FIG. 2-decoding table, determines which to select, a 3-bit original signal from which a 4B signal is coded or 3 bits A1, A2 and A3 as received, and outputs a select signal indicating which to select.

Thus, the selector 6a, based on the select signal from the selection controller 5a, selects either the original signal from which a 4B signal is coded or 3 bits A1, A2 and A3 as received, thus converting a 4B signal to a 2B signal.

FIG. 5 is a disparity detection circuit of the related art, which is a detailed circuit of the disparity detectors 2a and 3a shown in FIG. 4. The disparity detector 3a portion (enclosed in a broken line) of the disparity detection circuit detects disparity of defined 4B signals and the disparity detector 2a portion (outside the broken line) detects the disparity of undefined 4B signals.

Reference numerals D1, D2, D3 and D4 correspond to A1, A2, A3 and A4 bits of a 4B signal, respectively; XD1, XD2, XD3 and XD4 are the negation of the D1, D2, D3 and D4, respectively.

According to the FIG. 1-coding table, the AND, NAND and NOR gates constituting the disparity detection circuit (or disparity detectors 2a and 3a shown in FIG. 4) perform respective logical operations on the D1-D4, and XD1-XD4 to output signals M2, M1, M13, M3, M0, M4 and MERR, which are low-active. Signals M2, M1, M13 and M3 represent the disparity "0", "−2", "±2" and "+2" of defined 4B signals, respectively. Signals M0 and M4 represent the disparity "−4" and "+4" of undefined 4B signals. Signal MERR represents undefined 4B signals.

Accordingly, the thus-constructed disparity detection circuit of the related art requires as large amount of circuitry as fourteen 4-input AND gates, two 4-input NAND gates, one 4-input NOR gate, three 2-input AND gates, two 2-input NOR gates and one 6-input NOR gate.

A problem is that the disparity detection circuit (i.e., disparity detectors 2a and 3a) of the related art occupies a large part of a 2B4B-coded signal decoder in circuit amount, increasing the cost and the size and reducing the reliability of the 2B4B-coded signal decoder.

SUMMARY OF THE INVENTION

It is an object of the present invention to provide a small-sized and economical disparity detection circuit used for a 2B4B-coded signal decoder.

It is another object of the present invention to provide a reliable disparity detection circuit used for a 2B4B-coded signal decoder.

To achieve the above and other objects, the present invention provides a disparity detection circuit used in a signal decoder which decodes a 4-bit signal into an original 3-bit signal, from which the 4-bit signal is coded according to a coding rule stipulating that an original 3-bit signal should be coded into a 4-bit signal with 1 additional bit added and with pre-determined disparity carrying, for determining whether the 4-bit signal conforms to the coding rule, and for detecting the disparity of the 4-bit signal which is determined as conforming to the coding rule.

BRIEF DESCRIPTION OF THE DRAWINGS

FIG. 1 is a coding table illustrating an example of a 2B4B coding rule;

FIG. 2 is a decoding table illustrating an example of decoding a 4B signal;

FIG. 3 is a table illustrating the disparity for 4B signals;

Throughout the above-mentioned drawings, identical reference numerals are used to designate the same or similar component parts.

DESCRIPTION OF THE PREFERRED EMBODIMENTS

Figure 6:
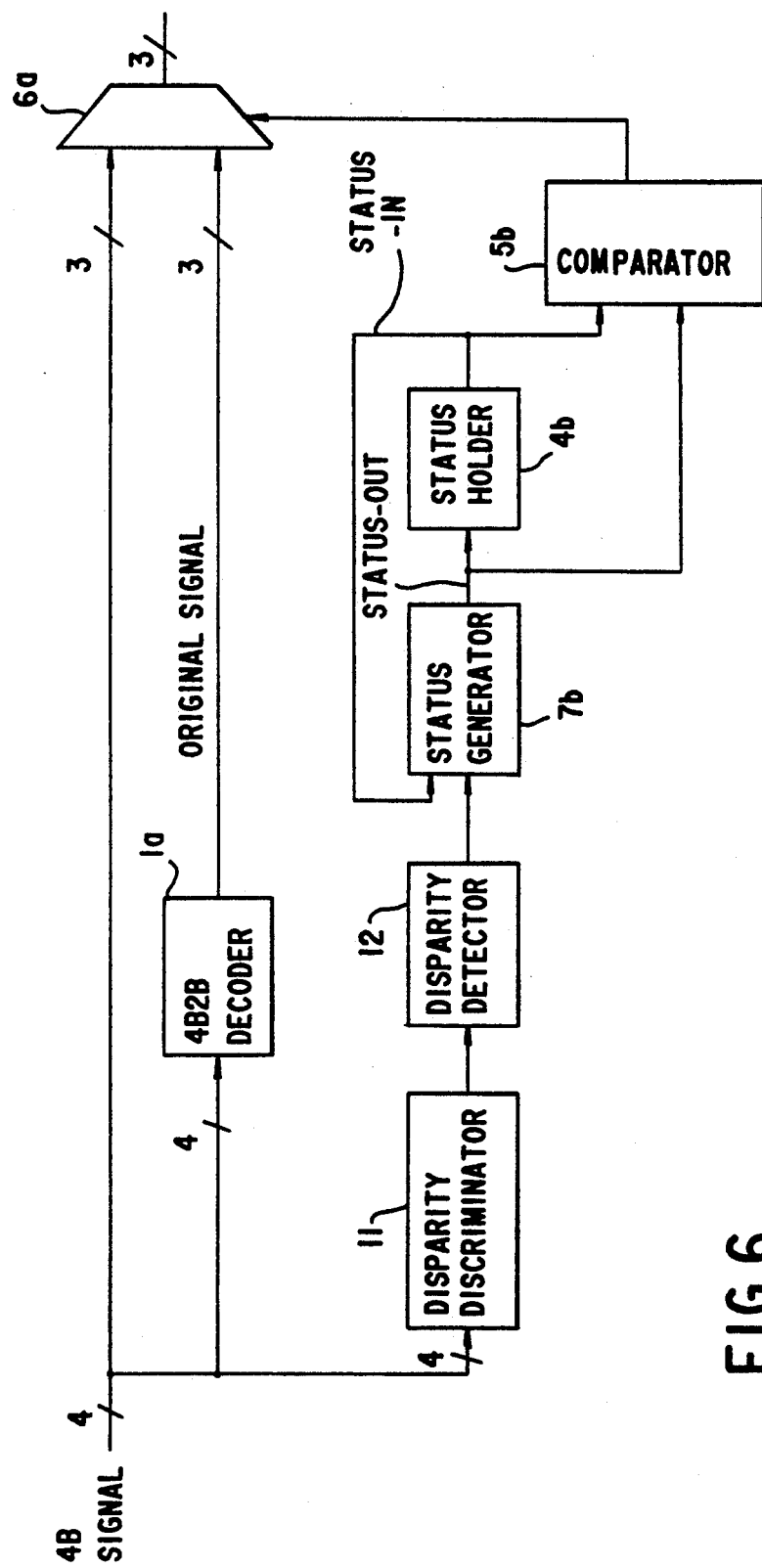
FIG. 6 is a block diagram illustrating a decoder circuit of the present invention

FIG. 6 is a block diagram illustrating a decoder circuit of the present invention, which decodes a 2B4B-coded signal (i.e., 4B signal) into a 2B signal.

A 4B signal received at a receiving end is supplied to a selector 6a, 4B2B decoder 1a and disparity discriminator 11. The 4B2B decoder 1a decodes the 4B signal into an original signal (2-bit main signal and 1-bit service signal) from which the 4B signal is coded according to the FIG. 1-coding table. The disparity discriminator 11 and a disparity detector 12 connected in series thereto, which constitute a disparity detection circuit and a characteristic feature of the present invention, detect disparity (−4, +4, −2, +2) of the undefined 4B signals and that (0, −2, +2) of the defined 4B signals (see the FIG. 1-coding table).

A status generator 7b, based on a later-explained status-in signal and the disparity detected by the disparity discriminator 11 and a disparity detector 12, generates a status-out signal (logical 0 or 1) according to the FIG. 2-decoding table. A status holder 4b, which is a flip-flop, for example, inputs and holds the status-out signal from the status generator 7b.

A comparator 5b compares bit-by-bit the output of the status holder 4b (i.e., status-in) with the status-out signal from the status generator 7b. Based on a mismatch or match of the comparison, the comparator 5b outputs a select signal indicating which to select, a 3-bit original signal from which a 4B signal is coded (according to the FIG. 1-coding table) or 3 bits A1, A2 and A3 as received, respectively. Although an original signal is to be selected as a B2 signal for a defined 4B signal with disparity "0" according to the FIG. 2-decoding table, the select signal causes 3 bits A1, A2 and A3 to be selected as received. This is reasonable because for a particular original signal whose disparity is set to "0" when coded according to the FIG. 1-coding table, the original signal is output as it is with 1 additional bit added to form a 4B signal.

The selector 6a, based on the select signal from the comparator 5b, selects either the original signal from which a 4B signal is coded or 3 bits A1, A2 and A3 as received, thus converting a 4B signal to a 2B signal. Thus, the 2B4B-bit-coded signal decoder of the present invention decodes a 4B signal received into a proper 2B signal.

Figures 7, 8:
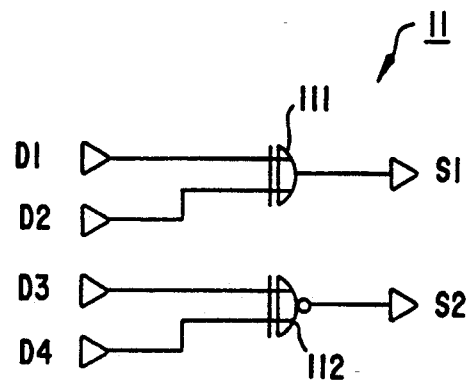
FIG. 7 is a detailed circuit illustrating a part of the disparity discriminator 11.
FIG. 8 is a function table illustrating the function of the disparity discriminator 11.

FIG. 7 is a detailed circuit illustrating a part of the disparity discriminator 11.

The disparity discriminator 11 comprises an exclusive-OR (EX-OR) gate 111 and an exclusive-NOR (EX-NOR) gate 112. High-order 2 bits D1 and D2 of 4B signal (D1, D2, D3 and D4) are input to the EX-OR gate 111 to output a signal S1. Low-order 2 bits D3 and D4 are input to the EX-NOR gate 112 to output a signal S2.

FIG. 8 is a function table illustrating the function of the disparity discriminator 11.

When both signals S1 and S2 are logical 1, disparity is not defined in the FIG. 1-coding table; otherwise, disparity is defined. That is, when signals S1 and S2 are both logical 0, disparity is "+2" or "−2" (i.e., "±2"); when they differ in binary value, disparity is "0".

Figure 9:
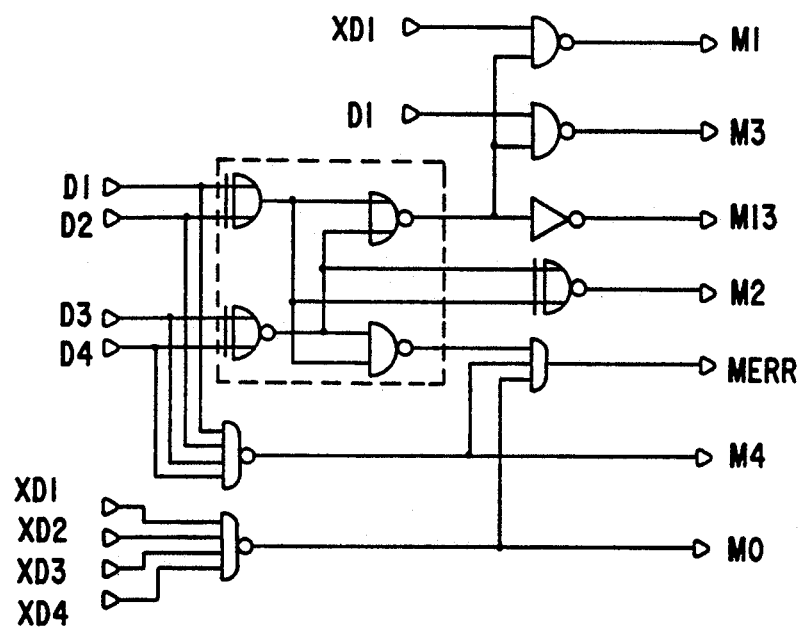
FIG. 9 is a disparity detection circuit of the present invention.

FIG. 9 is a disparity detection circuit of the present invention.

In FIG. 9, reference numerals D1, D2, D3 and D4 correspond to A1, A2, A3 and A4 bits of a 4B signal, respectively. XD1, XD2, XD3 and XD4 are the negation of the D1, D2, D3 and D4, respectively.

Figure 4:
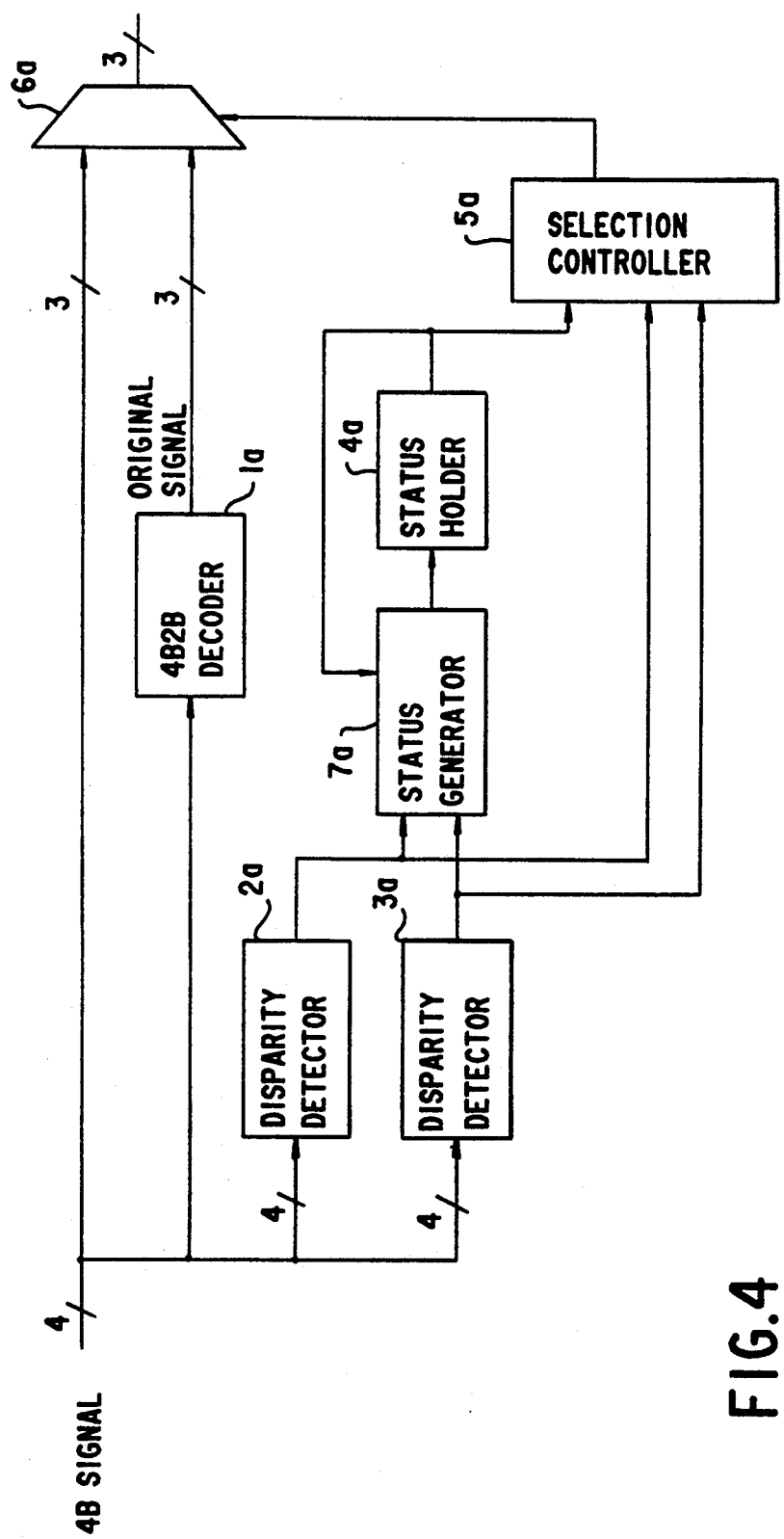
FIG. 4 is a block diagram illustrating a decoder circuit of related art.
Figure 5:
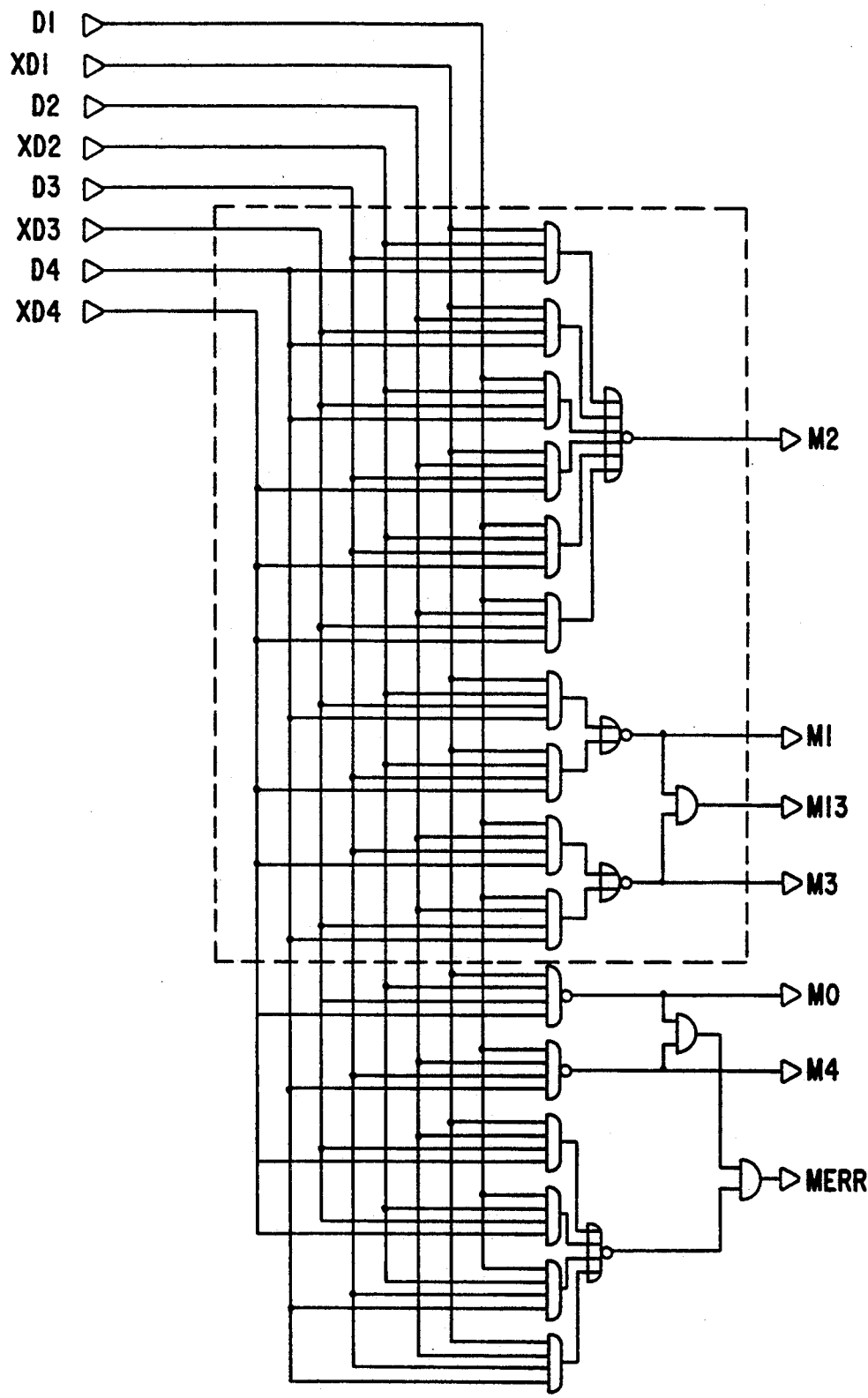
FIG. 5 is a disparity detection circuit of the related art.

The disparity detection circuit has a two-stage configuration with the disparity discriminator 11 (an EX-OR gate 111, EX-NOR gate 112, NOR gate and NAND gate enclosed in a broken line) connected in series to the disparity detector 12 (the other gates outside the broken line). The disparity detection circuit inputs signals D1-D4, XD1-XD4 and outputs low-active signals M2, M1, M13, M3, M0, M4 and MERR, meaning the same as in FIG. 5. The disparity discriminator 11 first determines whether a 4B signal is defined or undefined in FIG. 1-coding table, as in FIG. 8, then the disparity detector 12 detects disparity for the 4B signal.

As shown in FIG. 9, the disparity detection circuit requires one each of EX-OR, EX-NOR, 2-input NOR and 2-input NAND [and two EX-NOR gates] for the disparity discriminator 11; and two 4-input NAND gates, one 3-input AND gate, two 2-input NAND gates, one EX-NOR gate and one inverter for the disparity discriminator 12. Thus the disparity detection circuit of the present invention, which detects disparity in two stages, requires less than half as much circuitry (i.e., in FIG. 9 there are 11 gates) as that of the related art (i.e., in related art FIG. 5 there are 23 gates and, moreover, most of the gates there are 4-input gates) which detects disparity in one stage by ANDing or NANDing all the 4 bits of the 4B signal all together, which allow 16 bit-combinations.

Moreover, while the selection controller 5a of the related art generates the select signal based on the disparity detected, status-in and status-out and according to the FIG. 2-decoding table, the comparator 5b of the present invention generates the select signal simply by comparing bit-by-bit the status-in signal with the status-out signal, allowing it to be an EX-OR or EX-NOR gate.

As is apparent by the above description, the present invention can halve the amount of circuitry required for the disparity detection circuit of the related art, thus reducing the cost and size and improving the reliability of a 2-bit to 4-bit coded signal decoder.

What is claimed is:

1. A disparity detection circuit used in a signal decoder which decodes a 4-bit signal into an original 3-bit signal, the 4-bit signal being coded from the original 3-bit signal according to a coding rule which stipulates that an original 3-bit signal should be coded into a 4-bit signal with 1 additional bit added and with pre-determined disparity carrying, said disparity detection circuit comprising:

disparity determination means for determining whether the 4-bit signal conforms to the coding rule; and disparity detection means, connected in series to said disparity determination means, for detecting the disparity of the 4-bit signal which is determined by said disparity determination means as conforming to the coding rule.

2. A disparity detection circuit used in a signal decoder which decodes a 4-bit signal into an original 2-bit main signal and 1-bit service signal, the 4-bit signal being coded from the original 2-bit main signal and 1-bit service signal according to a coding rule which stipulates that an original 2-bit main signal and 1-bit service signal should be coded into a 4-bit signal with 1 additional bit added and with pre-determined disparity carrying, said disparity detection circuit comprising:

disparity determination means for determining whether the 4-bit signal conforms to the coding rule; and disparity detection means, connected in series to said disparity determination means, for detecting the disparity of the 4-bit signal which is determined by said disparity determination means as conforming to the coding rule.

3. A disparity detection circuit according to either of claim 1 or 2, wherein said disparity determination means determines that the 4-bit signal conforms to the coding rule, based upon a combination of whether 2 bits out of the 4-bit signal are equal in binary and whether the other 2 bits are unequal in binary.

4. A disparity detection circuit according to either of claim 1 or 2, wherein said disparity determination means determines that the 4-bit signal conforms to the coding rule, based upon whether high-order 2 bits of the 4-bit signal are equal in binary and whether low-order 2 bits are unequal in binary.

5. A disparity detection circuit according to claim 2, wherein said disparity determination means comprises:

an exclusive OR gate which inputs high-order 2 bits of the 4-bit signal;

an exclusive NOR gate which inputs low-order 2 bits of the 4-bit signal;

a NOR gate which inputs an output of said exclusive OR gate and that of said exclusive NOR gate; and a NAND gate which inputs an output of said exclusive OR gate and that of said exclusive NOR gate, and wherein said disparity detection means comprises:
  a first NAND gate which inputs an output of said NOR gate and a highest-order bit of the 4-bit signal and provides an output representing disparity "+2"; and
  a second NAND gate which inputs an output of said NOR gate and a negation of the highest-order bit of the 4-bit signal and provides an output representing disparity "−2";
  an exclusive NOR gate which inputs the output of said exclusive OR gate and that of said NOR gate and provides an output representing disparity "0";
  a first NAND gate which inputs 4 bits of the 4-bit signal;
  a second NAND gate which inputs respective negation of 4 bits of the 4-bit signal; and
  an AND gate which inputs respective outputs of said NAND gate and said first and second NAND gates.

* * * * *